United States Patent [19]

Crompton

[11] Patent Number: 4,907,290

[45] Date of Patent: Mar. 6, 1990

[54] MOBILE TRANSMITTER/RECEIVER

[75] Inventor: Edward W. Crompton, Harrow, England

[73] Assignee: Datatrak Limited, Swindon, England

[21] Appl. No.: 193,826

[22] Filed: May 13, 1988

[30] Foreign Application Priority Data

May 15, 1987 [GB] United Kingdom ............... 8711490

[51] Int. Cl.$^4$ ............................................. H04B 1/00
[52] U.S. Cl. ...................................... 455/56; 455/54; 455/67; 342/463
[58] Field of Search ....................... 455/88, 89, 99, 53, 455/54, 56, 345, 67, 62, 68, 226, 185, 186; 342/456, 458, 463; 340/825.36, 989, 990, 993, 994

[56]   References Cited
U.S. PATENT DOCUMENTS

| 4,350,970 | 9/1982 | Von Tomkewitsch | 340/989 |
| 4,550,443 | 10/1985 | Freeburg | 455/33 |
| 4,570,227 | 2/1986 | Tachi et al. | 340/990 |

OTHER PUBLICATIONS

King, "High Resolution Automatic Vehicle Locating System", GEC Journal, 1978.

Primary Examiner—Benedict V. Safourek
Assistant Examiner—Curtis A. Kuntz
Attorney, Agent, or Firm—Paul L. Sjoquist

[57] ABSTRACT

A mobile transmitter/receiver is for use in a communication system comprising a plurality of fixed transmitters/receivers located at spaced apart positions in a terrestrial area, each fixed transmitter/receiver operating on one or more of a plurality of radio frequency channels. The mobile transmitter/receiver comprises: a transmitting/receiving section for transmitting information to and receiving information from the fixed transmitters/receivers; a location determining section for receiving signals from the fixed transmitters/receivers for determining the location of the mobile transmitter/receiver within the communication system; data storage for storing information relating to radio communication paths from all locations in the area to the fixed transmitters/receivers; a selecting section for determining from the location of the mobile transmitter/receiver determined by the location determining section and the information stored in the data storage a selected one of said communication paths; and a conditioning section for conditioning the transmitting/receiving section in accordance with information stored in the data storage relating to the selected communication path.

5 Claims, 4 Drawing Sheets

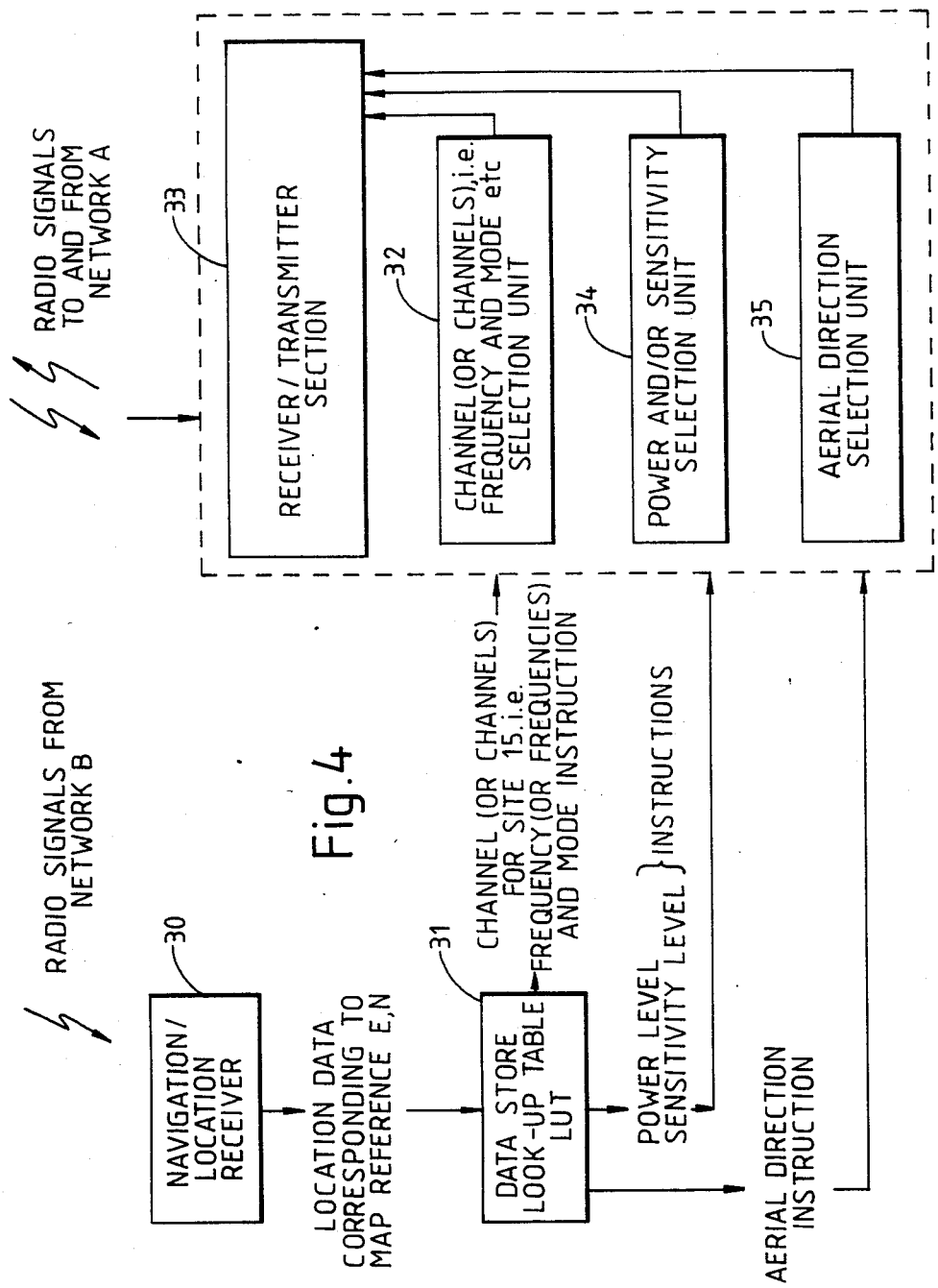

MOBILE TRANSMITTER/RECEIVER

This invention relates to mobile transmitters/ receivers for use in communication systems, for example, for determining the correct and most effective communication route or path between mobile transmitters/ receivers and fixed transmitters/receivers. The present invention also seeks to ensure the use of a correct technological standard, i.e. the correct frequency, modulation and other characteristics appropriate to the required communication path.

It is relatively easy to arrange for speech or data to be addressed and routed to a specific location which may be, for example, a telex machine in a particular room in a building or an operator positioned in an enquiry office. Setting up a communication path to a mobile terminal is more difficult.

Mobile terminals, whether vehicular or personal, are liable to be used in a large variety of locations so communication is normally maintained through the use of radio channels. If the radio system is complex, either the mobile terminal operator uses his knowledge of the radio system coupled with his assessment of his own location to decide which communication path to set up, or some automatic means must be provided.

If the mobile terminal is required to move over a large area a proportionately large number of radio sites are necessary. To provide for a large number of vehicles a considerable number of radio channels are needed, and all these channels must be connected in some logical way into a network if the system is to function as a coherent whole.

Very complex and sophisticated means have been developed to enable mobile terminals to address and route messages through such systems, for example, twenty-one 8 kbit/sec data channels are used in the TACS cellular system for this purpose alone, besides the additional supervision and monitoring data carried on message channels. This system s fundamentally a compromise, since the mobile terminal has to sense its radio environment so that it can make a decision as to which radio path is appropriate for that location. The vagaries of radio propagation cause errors in this process, particularly in an area where the radio signals from two or more sites are approximately equal in strength. Also the signals from a distant transmitter in a good location may at times be stronger than those from a local station, though the latter will usually be more consistently satisfactory.

Communication systems currently under consideration may need to span continents with numerous individual communication systems being the responsibility of one or more national operators. In these circumstances the foregoing methods of addressing and routing message become very unwieldy. They are also liable to take up a disproportionate amount of time in relation to the message itself. Most routine data messages occupy a communication channel for only a fraction of the time taken by a complex network to set up the communication path.

The radio channels may use parts of the radio spectrum with propagation characteristics which vary significantly with temperature, moisture, time, etc. and in such circumstances the automatic sensing methods could prove impracticable.

The present invention seeks to provide a mobile transmitter/receiver which employs a location infrastructure to provide location information to the mobile transmitter/receiver thus eliminating most of the problems discussed above.

According to one aspect of the present invention there is provided a mobile transmitter/receiver for use in a communication system comprising a plurality of fixed transmitters/receivers located at spaced apart positions in a terrestial area, each fixed transmitter/receiver operating on one or more of a plurality of radio frequency channels, and locating means, the mobile transmitter/receiver comprising: transmitting/receiving means for transmitting information to and receiving information from the fixed transmitters/receivers; location determining means for receiving signals from the locating means for determining the location of the mobile transmitter/ receiver within the communication system; data storage means for storing information relating to radio communication paths from all locations in the area to the fixed transmitters/receivers; selecting means for determining from the location of the mobile transmitter/ receiver determined by the location determining means and the information stored in the data storage means, a selected one of said communication paths; and conditioning means for conditioning the transmitting/receiving means in accordance with information stored in the data storage means relating to the selected communication path.

Preferably the mobile transmitter/receiver includes means for conditioning the transmitting/receiving means in accordance with power and/or sensitivity information from the data storage means relating to the selected communication path.

Additionally or alternatively the mobile transmitter/receiver may include means for directing a radio beam from the transmitting/receiving means in accordance with information from the data storage means relating to the direction of the selected communication path.

The data storage means may include a look-up table.

According to a further aspect of the present invention there is provided a communication system comprising: a plurality of fixed transmitters/receivers located at spaced apart positions in a terrestial area, each fixed transmitter/receiver operating on one or more of a plurality of radio frequency channels; locating means; and a plurality of mobile transmitters/receivers each comprising: transmitting/receiving means for transmitting information to and receiving information from the fixed transmitters/receivers, location determining means for receiving signals from the locating means for determining the location of the mobile transmitter/receiver within the communication system, data storage means for storing information relating to radio communication paths from all locations in the area to the fixed transmitter/ receivers, selecting means for determining from the location of the mobile transmitter/receiver determined by the location determining means and the information stored in the data storage means, a selected one or said communication paths, and conditioning means for conditioning the transmitting/receiving means in accordance with information stored in the data storage means relating to the selected communication path. The invention is illustrated, merely by way of example, in the accompanying drawings, in which:

Figure 3A:
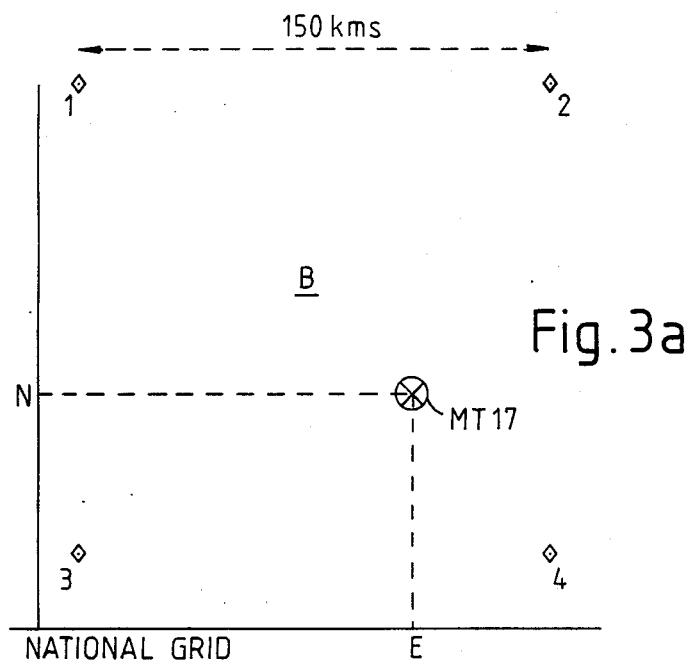
Figure 3B:
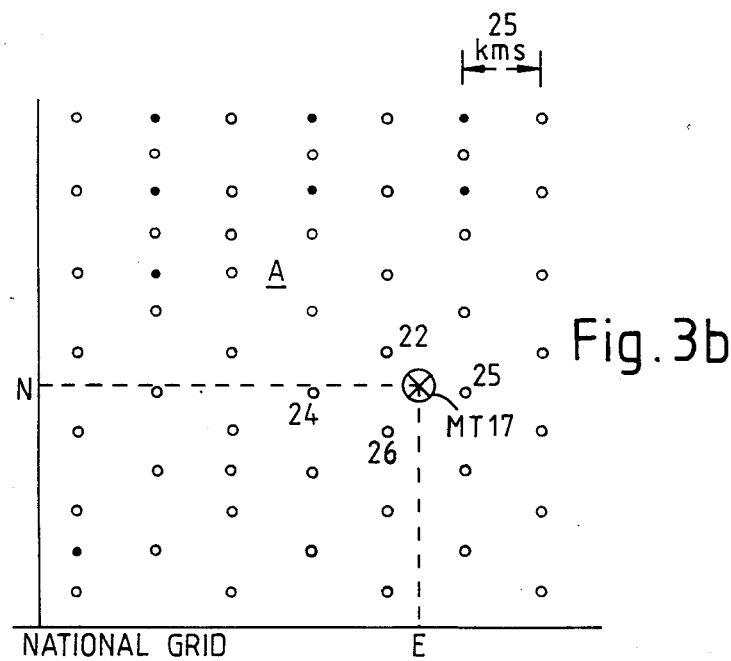

FIGS. 3a and 3b are diagrams illustrating the operation of a communication system using a mobile transmitter/receiver according to the present invention; and FIG. 4 is a block diagram of a mobile transmitter/receiver according to the present invention. Two-way communication with a mobile transmitter/ receiver or terminal is generally achieved through the medium of one or a plurality of short-range radio frequencies (hereinafter referred to as channels) selected from the thousands that may be used. Different channels are used in different locations which may be only a short distance apart. Sometimes completely different channels are used for completely different communication purposes at the same location, for example the requirements of a speech channel and those for a data channel are different. Another consideration is that one channel to the mobile terminal may be used exclusively for one operational purpose, whilst an entirely separate channel or channels may be used to the same mobile terminal for different operational purposes.

To establish a communication path to a mobile terminal, two fundamental requirements must be met: 1. The correct radio frequency must be known and also the correct modulation and technological standards; 2. The location and address of the correct base station, i.e. the one with the best capability to access the mobile terminal, must be known.

Figure 1:
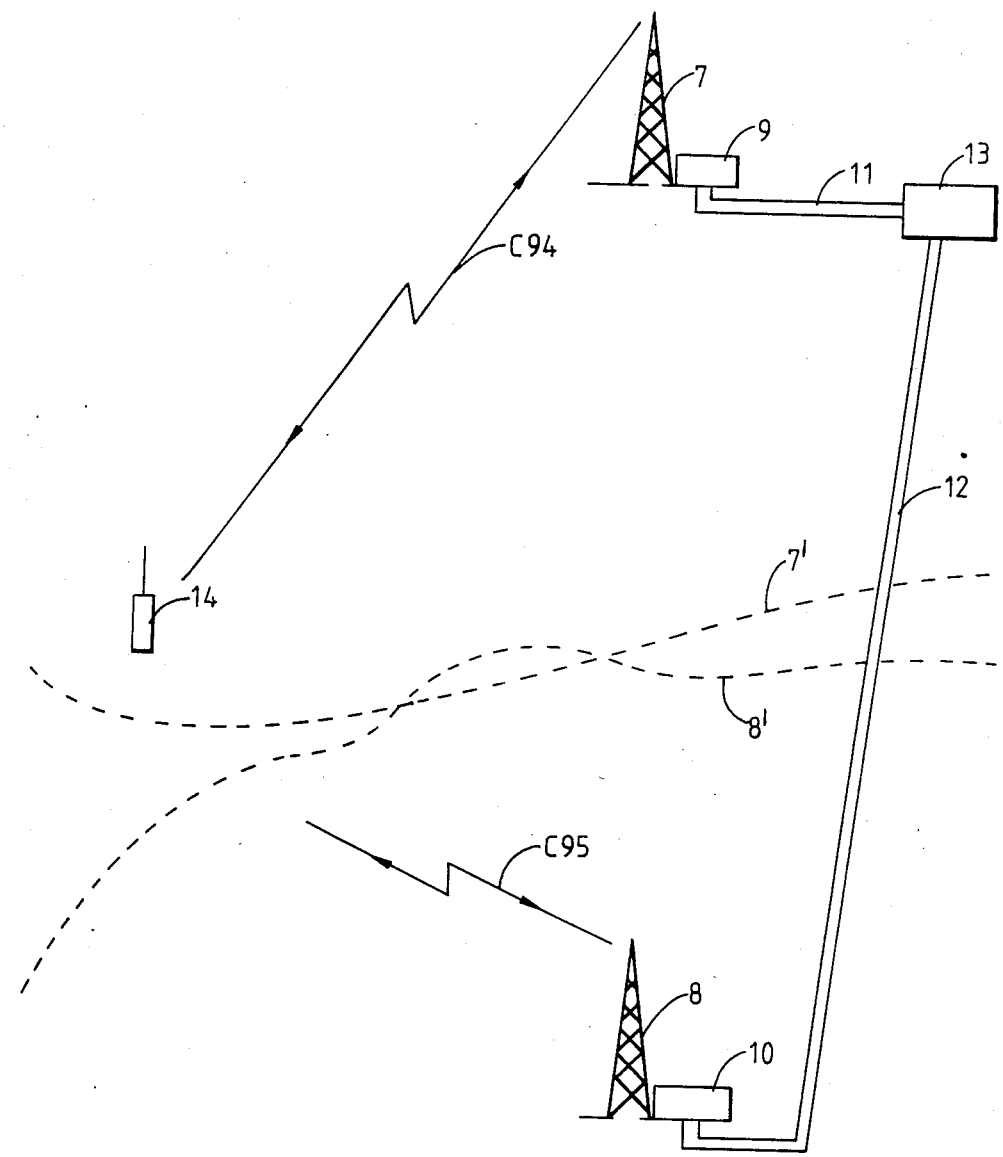
FIG. 1 is a schematic diagram of a manual communication system.

FIG. 1 shows a manual communication system having a radio base station 7 covering an area whose boundary is indicated by a broken line 7' and a radio base station 8 whose boundary is indicated by a broken line 8'. Each radio base station 7,8 includes a respective fixed transmitter/receiver 9,10. The fixed transmitters/receivers are connected by respective land lines 11,12 to a base control 13 through which communication is made with base terminals (not shown). The radio base station 7 uses a radio communication channel C94 and the radio base station 8 uses a radio communication channel C95. Thus a mobile transmitter/ receiver or terminal 14 within the area covered by the radio base station 7 has to be tuned to the channel C94 and when within the area covered by the radio base station 8 has to be tuned to the channel C95.

The simplest method of setting up a communication path using the system illustrated in FIG. 1 requires the operator of the mobile terminal 14 to memorise or refer to a tabulated list to establish the correct radio channel for each location in which he finds himself. This necessitates frequent changes, particularly if the mobile terminal 14 is in a fast moving vehicle. If the base control 13 is connected in tandem into a public switched telephone network (PSTN) the operator of the mobile terminal will also have to use an appropriate telephone code for routing and addressing his calls to a particular base terminal, e.g. a telephone. In effect, apart from identifying the base terminal for communication the operator will have to define the communication path appropriate to this purpose.

Having done so there are several management methods of initiating a call from a base terminal to such a mobile terminal. The simplest is to maintain a manual record of the most recent area of operation of the mobile terminal so that the same channel can be used for communication. Regular routine calls may be used to ensure the frequent updating of this manual record. Another method is to cycle the call from the base terminal through successive base stations using the appropriate channel in each case to determine in which area the mobile terminal is operating, if at all.

There are many variations of these methods of originating a call to a mobile terminal from a base terminal, but they all invariably take up some channel capacity for setting up purposes and thus reduce the channel capacity for conveying useful communication information.

It is also evident that, whilst the manual method may be acceptable with relatively uncomplicated small overall area networks, it becomes impractical for large area networks which are invariably complex, and may use many hundreds of radio channels from a large number of fixed base stations whose areas of coverage may also be sectorised.

Figure 2:
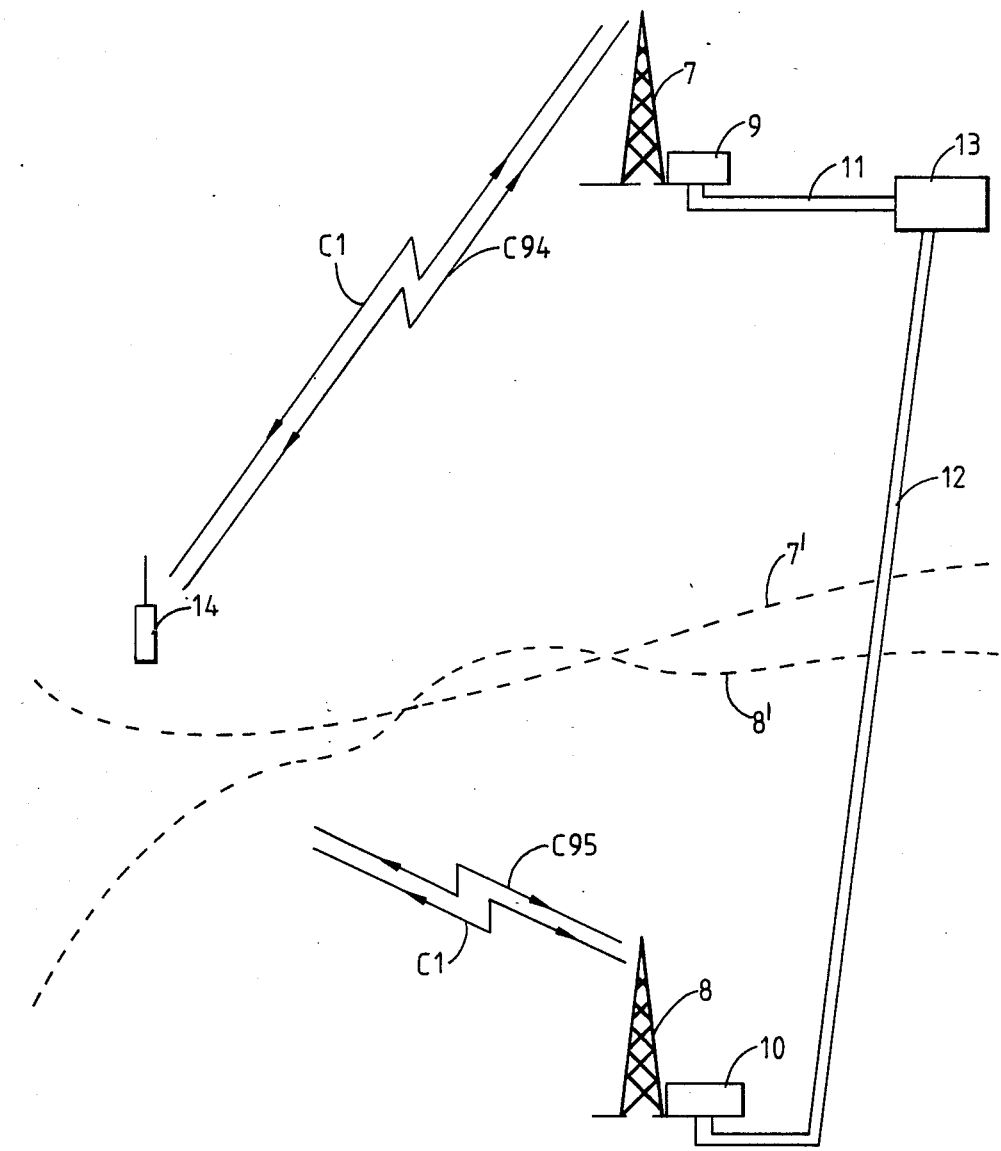
FIG. 2 is a schematic diagram of an automatic communication system.

FIG. 2 illustrates a very simple communication system for automatically routing messages through the fixed base stations in the best location for communicating with the required mobile terminal.

A specific control channel C1 is reserved for setting-up purposes. The mobile terminal 14 is always tuned to this control channel when it is inactive and automatic regular calls are made to all base stations and acknowledged by those near enough to be in communication. The strongest radio signal received on the control channel C1 (in the example shown, the signal from the base station 7) is used to determine the correct channel C94 for the mobile terminal to use. After moving to a new location the radio signal received on the control channel C1 from the base station 8 may become stronger than that from the others, and so "handover" to the base station 8 occurs and the message continues on channel C95 with only momentary interruption.

This system, however, becomes extremely complicated when a large number of channels are used from each base station. Also very small areas or "cells" of only a kilometre across are frequently used for personal radio communications, so frequent "handovers" and changes of frequency are necessary, thus causing each mobile terminal to occupy yet more control channel time. Some networks have become so complex that multiple control channels are necessary, thus causing further complication.

FIGS. 3a, 3b and 4 are diagrams illustrating the operation of a mobile communication system wherein a correct communication path within a network A (FIG. 3b) to and from a mobile transmitter/receiver or terminal MT17 according to the present invention is automatically determined. The network A may operate in the u.h.f. radio band. Each dot in FIG. 3b represents a fixed base station, e.g. a fixed transmitter/receiver linked to a common control centre (not shown) or one cell of a cellular telephone network such as AMPS or TACS. In a terrestial area covering a square with sides of 150km there will be approximately forty fixed base stations if they are based apart from each by 25km. In a cellular telephone network, for example, the fixed base stations or cells may be spaced apart by considerably less than 25km.

The configuration and mode of communication of the network A may be conventional and does not form part of the present invention. The communication system shown in FIGS. 3a and 3b determines the correct communication path between the mobile terminal MT17 and a control centre to which the fixed base stations are connected and hence from the control centre to, for example, a public switched telephone network. Thus there is provided a separate network B shown in FIG.

3a which may operate on a low frequency radio band and which serves for radio navigation and location purposes.

The terrestial area represented by FIG. 3a is defined by four hyperbolic navigation transmitters 1 to 4, and is identical to the terrestial area covered by the network A of FIG. 3b. Whilst the networks A,B are shown separately in FIGS. 3a and 3b, it will be appreciated that the mobile terminal within the terrestial area covered will be able to receive signals from both networks.

FIGS. 3a and 3b show the mobile terminal MT17 located at map reference E,N. The mobile terminal MT17 has a navigational receiver 30 (FIG. 4) to derive positional information from the signals received from the transmitters 1 to 4. The navigational receiver produces a bit-coded positional signal representative of the location of the mobile terminal MT17 at map reference E,N. This positional signal is used by a central processor, in conjunction with a data store and look-up table 31 which is a database using any form of magnetic or optical or other storage medium. The data store and look-up table 31 contains pre-recorded information regarding communication paths from all locations to the base stations of the network A. Positional information from the navigation receiver is compared with the information stored in the data store and look-up table 31 which then determines the most appropriate communication path from the particular location of the mobile terminal to a base station. It is assumed from the example illustrated in FIG. 3b with the mobile terminal and map reference E,N that the most appropriate communication path is to a base station 25 as opposed to adjacent base stations 22,24 or 26 by virtue of being closest and there being no intermediate geographical or other obstacles. If there was an obstacle, e.g. a hill between the mobile terminal MT17 and the base station 25, the data store and look-up table would contain information to indicate that, say, the base station 22 represented the most appropriate communication path.

The data store and look-up table 31 provides information to a channel selection unit 32, which tunes a transmitter/receiver section 33 of the mobile terminal to the or one of the channels on which the base station 25 operates. The transmitter/receiver section 33 may be capable of accessing a large variety of radio communication systems using various frequency bands, different modes of modulation, and be capable of conveying speech, data, facsimile information, etc.

The data store and look-up table also provides information (a) about the appropriate power level the receiver/transmitter section 33 should use when communicating with the base station 25 and (b) if desired, about the sensitivity level to which the receiver/transmitter section 33 should be set to minimise interference between signals received by the mobile terminal at its particular location. This information is fed to a power and/or sensitivity selection unit 34 which appropriately conditions the receiver/transmitter section 33.

The data store and look-up table 31 also produces information about the relative direction of the mobile terminal MT17 from the base station 25 (it lies due east in FIG. 3b). This information is fed to an aerial direction selection unit 35 which controls an aerial of the receiver/transmitter section 33 to steer the radio beam from the receiver/transmitter section 33 in an easterly direction, in this example, towards the base station 25. Conventional electronic steering of a directional aerial may be used for this purpose.

Information from the data store and look-up table may be sent to the base station 25 to condition the base station in a similar way to use the correct power setting and to direct its radio beam in the direction of the mobile terminal when communicating with it.

The mobile terminal MT17 will thus communicate with base station 25 to convey its identity, the correct power setting for the communication path, and the correct reverse direction from the base station to the mobile terminal. If the base station uses trunked radio channels the choice of the appropriate channel may be made using any of the normal methods. The base station informs the common control centre of the availability of mobile terminal MT17 through this communication path. Thus a call from a base terminal to the mobile terminal can be set up by the common control centre which contains information relating to the communication path to the mobile terminal. The mobile terminal communicates with the common control centre sufficiently frequently via appropriate base stations, so that the common control centre contains up-to-date information as to the communication path to use from a base terminal to the mobile terminal. If the mobile terminal has moved to the area of a different base station of the same network, the common control centre will be aware of this, and any message from the base station to the mobile terminal will be correctly routed within the network.

If a vehicle bound from London to Marseilles has thus been logged into a London network for the first part of its journey, it will need access to several other networks en route. Data will have been obtained from any appropriate Paris network and Lyons network and this data will be entered into the data store and lookup table 31 of the mobile terminal MT17. When the vehicle is approaching Paris, positional information determined by the mobile terminal, will ensure that the mobile terminal is correctly tuned to the Paris network and will ensure that the most appropriate communication paths are used as the mobile terminal moves through the Paris network. The same applies as the vehicle enters the Lyons network.

The communication between the mobile terminal and the base stations of all the networks may be automatic, i.e. without any human intervention. The system may thus be used to automatically track containers used for transporting goods along roads, canals or railways, etc.

It will be appreciated that any means may be used to provide the mobile terminal with positional information. For example, a dead-reckoning method may be used. Once the location of the mobile terminal is known, using pre-recorded and stored information in the mobile terminal relating to all locations in the area of operation, and accessing this stored information using known data cross-referencing techniques (e.g. a socalled "look-up table"), enables access to any of a number of possible radio networks in any area, no matter how large. The invention can, thus, be used to integrate a large number of local networks in a continental area such as Europe or North America. For example, positional information determined by the mobile terminal, will enable the data store and look-up table to condition the transmitter/receiver section 33 not only as to the most appropriate communication path in any given communication network to use but also to the mode of communication of the given communication network within which the mobile terminal is located. In other words, the information stored in each mobile terminal will allow it to set the correct radio frequency (channel), power, band width, mode of operation, etc. to its location and applies equally to speech, data, facsimile or other communication networks.

It will be appreciated that the mobile terminal can thus be precisely located in relation to the radio coverage pattern of the communication network. The necessary information regarding the network is stored in the mobile terminal in such a way that it can be accessed as soon as the location is determined. The positional information obtained is updated at suitable intervals so that the communication path is optimised as often as necessary to maintain a reliable communication path into the network during the entire course of the journey of the mobile terminal.

In effect, the present internal infrastructure determining the addressing and routing of speech and/or data to and from mobile terminals is replaced in the present invention by a much more efficient and effective external infrastructure operating in an entirely different way. The information contained in the data store and look-up table is prepared and optimised beforehand, so that the correct communication path between the mobile terminal and the particular base station is set up regardless of any vagaries in the radio conditions at the time.

I claim:

1. A mobile transmitter/receiver for use in a communication system comprising a plurality of fixed transmitters/receivers located at spaced apart positions in a terrestial area, each fixed transmitter/receiver operating on one or more of a plurality of radio frequency channels, and locating means, the mobile transmitter/receiver comprising: transmitting/receiving means for transmitting information to and receiving information from the fixed transmitters/receivers; location determining means for receiving signals from the locating means for determining the location of the mobile transmitter/receiver within the communication system; data storage means for storing information relating to radio communication paths from all locations in the area to the fixed transmitters/receivers; selecting means for determining from the location of the mobile transmitter/receiver determined by the location determining means and the information stored in the data storage means, a selected one of said communication paths; and conditioning means for providing the transmitting/receiving means with information stored in the data storage means relating to the selected communication path.

2. A mobile transmitter/receiver as claimed in claim 1 wherein said conditioning means further comprises means for providing the transmitting/receiving means with power and/or sensitivity information from the data storage means relating to the selected communication path.

3. A mobile transmitter/receiver as claimed in claim 1 or 2 including means for directing a radio beam from the transmitting/receiving means in accordance with information from the data storage means relating to the direction of the selected communication path.

4. A mobile transmitter/receiver as claimed in claim 1 or 2 in which the data storage means includes a lookup table.

5. A communication system comprising: a plurality of fixed transmitters/receivers located at spaced apart positions in a terrestial area, each fixed transmitter/receiver operating one or more of a plurality of radio frequency channels; locating means; and a plurality of mobile transmitters/receivers each comprising transmitting/receiving means for transmitting information to and receiving information from the fixed transmitters/receivers, location determining means for receiving signals from the locating means for determining the location of the mobile transmitter/receiver within the communication system, data storage means for storing information relating to radio communication paths from all locations in the area to the fixed transmitters/receivers, selecting means for determining from the location of the mobile transmitter/receiver determined by the location determining means and the information stored in the data storage means, a selected one or said communication paths, and conditioning means for providing the transmitting/receiving means with information stored in the data storage means relating to the selected communication path.

* * * * *